REVERSE WRITE AND FORWARD VERIFY READ OF A VARIABLE LENGTH DATA RECORD

Filed Feb. 16, 1968 3 Sheets-Sheet 1

INVENTOR.
GEORGE R. COGAR

Dec. 22, 1970 G. R. COGAR 3,550,103
REVERSE WRITE AND FORWARD VERIFY READ OF A VARIABLE LENGTH DATA RECORD
Filed Feb. 16, 1968 3 Sheets-Sheet 2
FIG. 5 (PART 1)
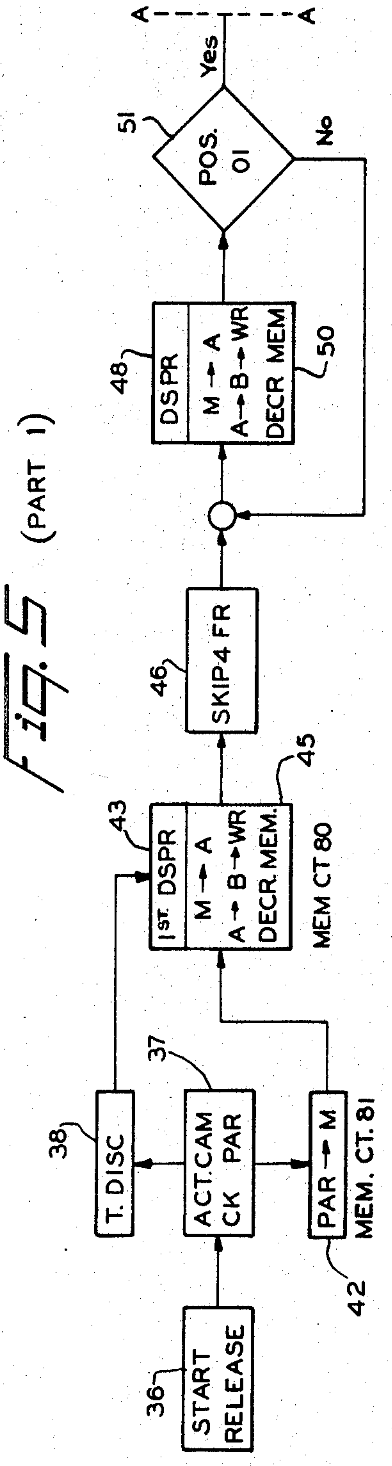
FIG. 6 PART 1
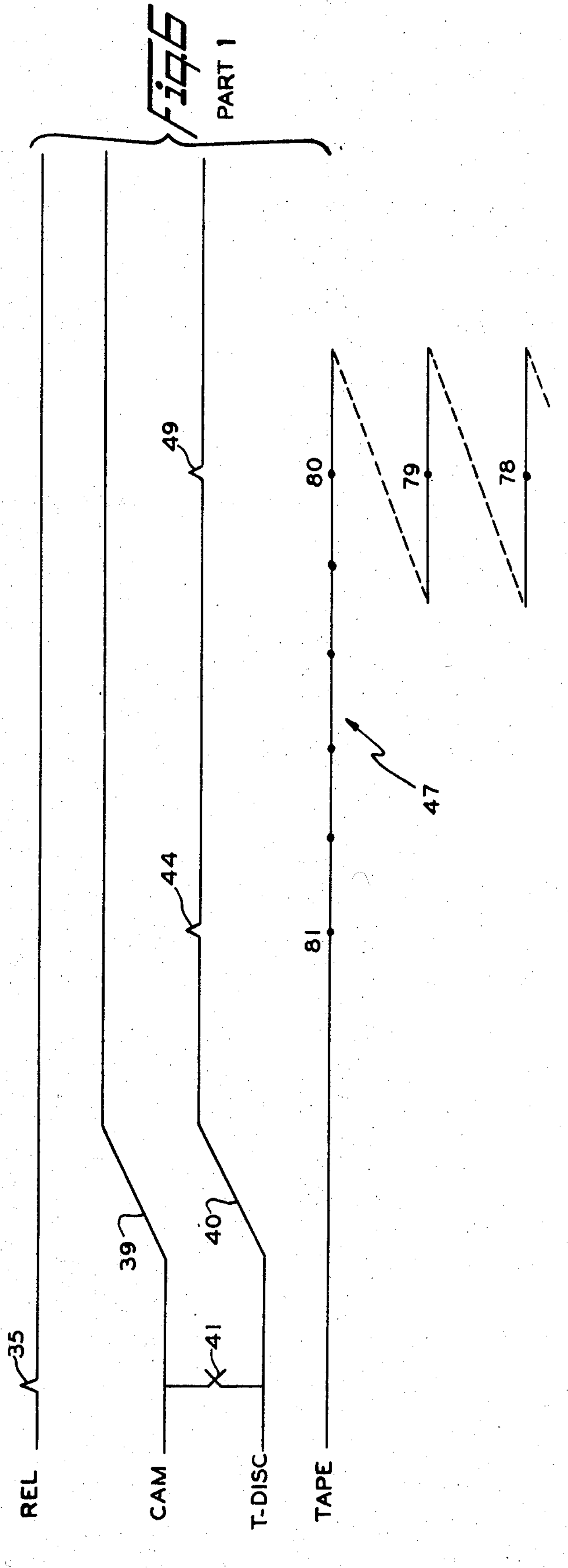

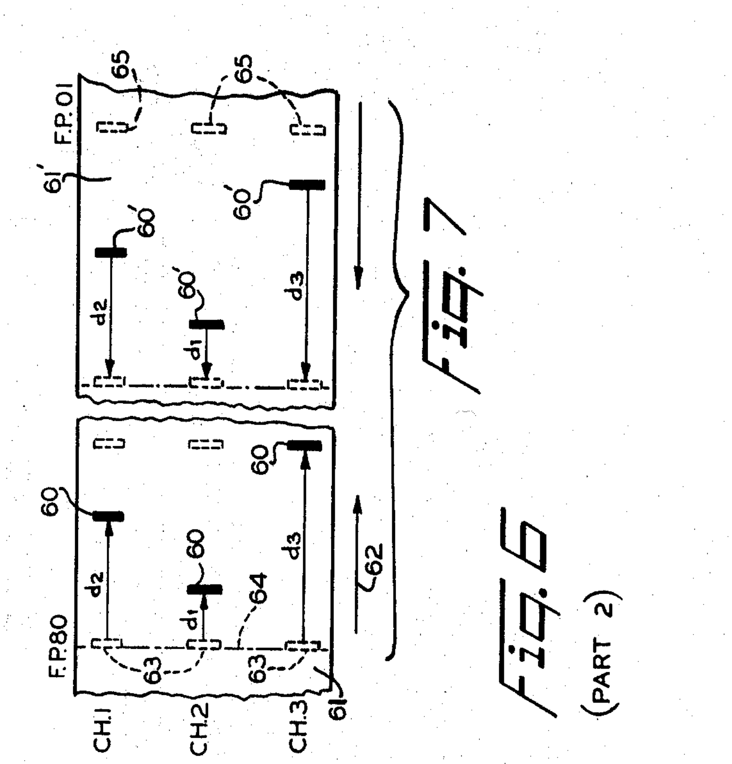
FIG. 6 (PART 2), FIG. 7
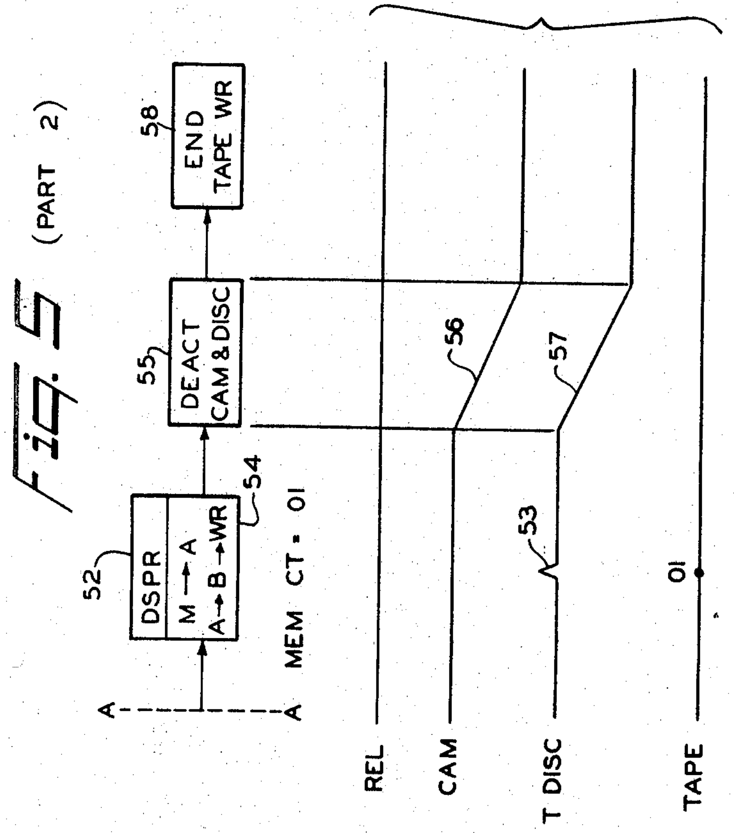
FIG. 5 (PART 2)

United States Patent Office 3,550,103
Patented Dec. 22, 1970

3,550,103

REVERSE WRITE AND FORWARD VERIFY READ OF A VARIABLE LENGTH DATA RECORD

George R. Cogar, Frankfort, N.Y., assignor to Mohawk Data Sciences Corporation, Stoneham, Mass.

Filed Feb. 16, 1968, Ser. No. 706,005
Int. Cl. G11b *5/02, 15/02, 15/20*
U.S. Cl. 340—174.1 8 Claims

ABSTRACT OF THE DISCLOSURE

Method and apparatus for feeding tape in a data recording machine whereby the tape is moved in the reverse direction while data is being recorded on the tape and then in the forward direction for a read after write check. This results in a reduction in the required number of tape movement actuations and also in the total time required for the tape cycle operation.

BACKGROUND OF THE INVENTION

This invention relates generally to data recording apparatus, and has particular reference to a novel tape movement arrangement for use in recording data on tape and thereafter checking the data that has been written.

The tape feed of the present invention is particularly adapted for use in a data recording machine of the type disclosed in co-pending application Ser. No. 541,450, now Pat. No. 3,483,523 filed Mar. 30, 1966 by George R. Cogar et al. In that machine, a data record is keyed into the machine and stored in a magnetic core memory. The data is then read (but not erased) from memory and written on tape after which the tape is backspaced the length of the record just written and the data is read from the tape and compared with the data as it is in memory.

In the operations just described, comprising the entry mode of the machine, the tape cycle portion requires that the tape be put into motion from a stationary condition, moved forwardly while the data record is being written on it and then stopped, moved in the opposite or reverse direction (backspaced) for the length of the record written, and then again moved forwardly for the read after write comparison. Because the direction of the tape movement is changed twice, a relatively large number of on and off operations of the movement actuating mechanisms are required.

SUMMARY OF THE INVENTION

In the method and apparatus of the present invention, the tape cycle requires but a single change in the direction of the tape movement. Thus, the tape is initially moved in the reverse direction and the data record is written on it in decending order from the highest to the lowest order data position. The tape movement is then stopped after which the tape is moved forwardly for the read after write check. Following this, the forward movement continues for a distance equal to the length of a record so that the cycle can be repeated.

An important advantage of the tape movement arrangement of this invention is that it results in a substantial reduction in the required number of tape movement actuations. In addition, since the tape cycle can be carried out in less time, there is a reduction in the lock-out time during which the operator cannot use the machine keyboard. Other advantages, as will be more fully explained hereinafter, are that the synchronous motor and precision crystal oscillator disclosed in said copending application Ser. No. 541,450, now Pat. No. 3,483,523 are no longer needed, and that the same skew delay can be used for both reading and writing when recording at the higher densities.

BRIEF DESCRIPTION OF THE DRAWINGS

FIG. 5, composed of parts 1 and 2, is a flow chart illustrating the sequence of events that take place in the data recording machine while data is being written on tape;

FIG. 6, composed of parts 1 and 2, is a schematic timing chart corresponding to FIG. 5; and FIG. 7 is a diagrammatic illustration of the manner in which the skew delay operates.

DESCRIPTION OF THE PREFERRED EMBODIMENT

In the data recorder disclosed in said co-pending application Ser. No. 541,450, now Pat. No. 3,483,523 data is entered into memory through the keyboard and the machine is signaled when the data record is complete. This signal causes a pinch roll to move into engagement with a constantly rotating capstan over which the tape passes. The tape is thus caused to move forwardly accelerating to a constant velocity.

The signal that actuates the pinch roll simultaneously initiates a count sequence controlled by a precision oscillator. The count sequence provides a delay period that is approximately equal to the time required to engage the pinch roll, allow the tape to accelerate to a constant velocity and permit movement of the tape to a predetermined position for commencement of the writing of data. In the pinch roll-capstan assembly that moves the tape in the forward direction, the capstan is driven by a constant speed synchronous motor.

Upon the tape being properly positioned for the commencement of the data recording, the core memory is accessed sequentially in ascending order at precise time intervals controlled by the precision oscillator. Thus, the positioning of the record and the amount of space between the individual frames that comprise the record are determined by the surface velocity of the capstan in relation to the frequency of the precision oscillator.

At the completion of the writing of the last frame of a record, a count sequence is again initiated to provide a positioning delay period that will determine the rest position of the tape when the pinch roll is disengaged from the capstan. Upon the cessation of the forward movement of the tape, a clutch is operated to permit a special cam to rotate. This cam engages the tape and moves it in the reverse direction an amount approximately equal to the forward movement of the tape during the tape write sequence. Upon completion of the reverse movement of the tape (tape backspace), the pinch roll is again engaged with the capstan causing the tape to again be moved forwardly so that the record just written can be read and compared with the contents of memory.

Figure 1:
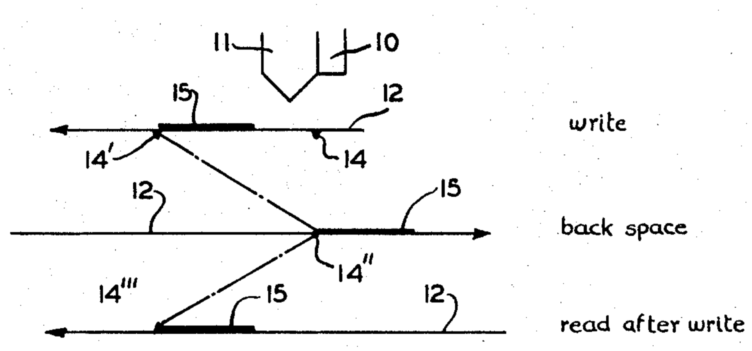
Fig. 1 (Prior Art)
FIG. 1 is a diagrammatic illustration of the tape movement in a prior art tape cycle.

The tape movement during the sequence of operations just described in diagrammatically illustrated by FIG. 1 of the drawings. In this figure, 10 is an erase hand, 11 a read-record head and the tape is indicated by the line 12. A theoretical reference point on the tape 12 is indicated by the reference number 14, and at the start of the tape cycle this point is located to the right of the read-record head as shown in the top line of FIG. 1. Forward movement of the tape is from right to left as indicated by the arrowhead and when the pinch roll is engaged, the tape moves forwardly beneath the read-record head and the data record that is stored in memory is written on the tape, the data record or block on the tape being diagrammatically illustrated by the heavy line 15. At the end of the tape write operation, the reference point 14 has moved to a new position 14' to the left of the read-record head.

Upon the cessation of the forward movement of the tape 12, the special cam referred to above is rotated to move the tape in the reverse direction as indicated by the middle line of FIG. 1. The reverse movement or backspacing of the tape is for a distance approximately equal to the amount of forward travel of the tape whereby the reference point is moved from its 14' position to a position 14'', approximately where it started. At the end of the reverse movement, the data record 15 is, therefore, located to the right of the read-record head as shown.

Following the reverse movement of the tape 12, the pinch roll is again engaged with the capstan causing the tape to move forwardly as indicated by the bottom line of FIG. 1. During this movement, as the record 15 passes beneath the head 11 (which has been switched from a record to a read condition), the contents of the record are read and compared with the contents of the record in memory. At the end of the tape read operation, therefore, the reference point has moved from its 14'' position to a position 14''' which is essentially the same as the 14' position.

In the just described tape cycle of the data recorder of co-pending application Ser. No. 541,450, now Pat. No. 3,483,523, it will be seen that the direction of tape movement must be changed twice (symbolically at 14' and 14''). Moreover, with this arrangement six on and off operations of the movement effecting mechanisms are required. Thus, the pinch roll must be engaged with the capstan (again symbolically) at 14 and disengaged at 14'; then the special cam to effect reverse movement must be engaged at 14' and disengaged at 14''; lastly, the pinch roll must be engaged at 14'' and disengaged at 14''.

Figure 2:
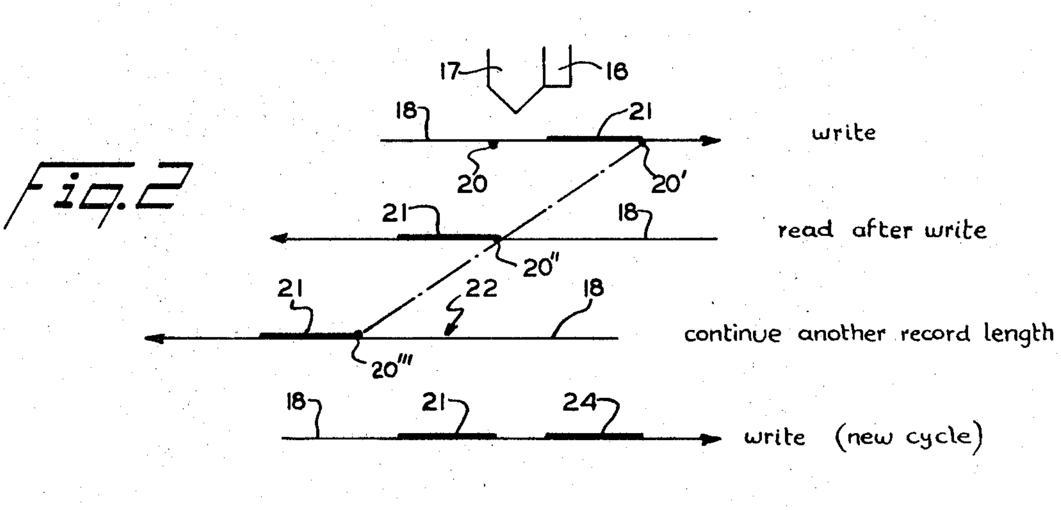
FIG. 2 is a diagrammatic illustration of the tape movement in a tape cycle as contemplated by the present invention.

The tape movement arrangement or tape cycle contemplated by the present invention is diagrammatically illustrated by FIG. 2. In this figure, the erase and read-record heads are shown at 16 and 17, respectively, and the tape is indicated by the line 18. A theoretical reference point on the tape is shown at 20, and at the start of the tape cycle this point is located to the left of the read-record head as shown in the top line of FIG. 2. In accord with the present invention, initial movement of the tape is from left to right or what would be the reverse direction in the tape movement of FIG. 1.

As the tape 18 moves from left to right beneath the read-record head, the data record that is stored in memory is sequentially accessed in descending order so that the data record stored therein is written on the tape in descending order from the highest to the lowest order data position. This results in a data record, illustrated by the heavy line 21, being written on the tape after which the tape movement is terminated. At the end of the tape write operation, the reference point 20 has moved to a new position 20' as indicated.

Upon the cessation of left to right or reverse movement of the tape 18, a pinch roll is engaged causing the tape to move from right to left or forwardly as indicated by the second line of FIG. 2. The pinch roll (not shown) is part of a pinch roll-capstan assembly such as the one disclosed in said copending application. During the forward movement of the tape, as the record 21 passes beneath the head 17 (which has been switched from a record to a read condition), the contents of the record are read and compared with the contents of the record in memory, this read after write check being the same as in the data recorder of the co-pending application (bottom line, FIG. 1).

When the read after write check has been completed, the reference point has moved from its 20' position to a position 20'', approximately where it started. However, unlike the previously described arrangement, the tape movement does not stop at this point but continues on in the same direction and a timing element such as a delay flop (not shown) of a conventional type is activated. After the tape has moved a distance equal to at least one complete data record plus an amount equal to the required reverse start distance, i.e., the distance needed to permit tape movement to be initiated and brought up to constant velocity, the delay flop expires terminating the forward movement of the tape. This continued forward movement causes the reference point to move from the 20'' position to a new position 20''' as shown by the third line of FIG. 2. With the reference point at 20''', the tape movement is terminated by disengagement of the pinch roll and this ends the tape cycle. In connection with the sequence of operations just described, it should be noted that as soon as the record 21 has passed beneath the read-record head to complete the read after write check, the erase head currents are turned on to erase the portion of tape, generally indicated at 22, on which the next record will be written.

The fourth line of FIG. 2 illustrates the start of a new tape cycle, the tape initially being moved in the left to right or reverse direction during which movement another record 24 is written by sequentially accessing memory in descending order from the highest to the lowest order data position.

From the description of the tape movement arrangement of the invention, it can be seen that a complete tape cycle requires but a single change in the direction of tape movement (symbolically at 20'). Moreover, with this arrangement, only four on and off operations of the movement effecting mechanisms are required. Thus, the cam, to be described, that effects reverse movement must be engaged (again symbolically) at 20 and disengaged at 20', and then the pinch roll must be engaged with the capstan at 20' and disengaged at 20''' to effect the forward movement of the tape.

Figure 3:
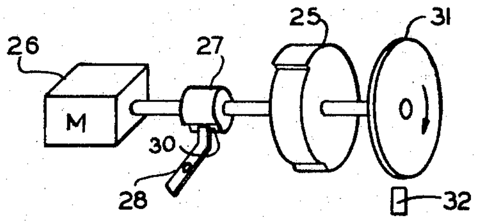
FIG. 3 is a schematic illustration, in isometric form, of the tape drive and timing mechanisms of the invention.

The cam that drives tape 18 in the reverse direction is illustrated schematically at 25 in FIG. 3. This cam corresponds to the drive backspace roller of co-pending application Ser. No. 541,450 which roller has a relieved area so that only a portion of its surface engages the tape. In this way, the distance that the tape is moved by the roller in a single revolution is a controlled, predetermined amount.

Cam 25 is arranged to be driven by a motor 26 but rotation of the cam is normally prevented by a cam 27 and rocker arm 28 forming a part of a commercially available wrap spring clutch. Thus, one end of the rocker arm is spring biased into engagement with a shoulder 30 on cam 27 thereby preventing its rotation and that of cam 25. The arm 28 can be rocked out of engagement with cam 27 by a solenoid actuator (not shown) when the latter receives an energizing signal. This is a momentary or single pulse signal so that the arm is rocked just long enough to release the cams for rotation after which the spring bias again takes over and moves the arm back into blocking position whereby the rotation is stopped after one revolution of the cams.

In order to control the timing of the tape write portion of the tape cycle, i.e., the spacing between the individual frames that comprise a record, the invention provides a timing disc 31 which is directly connected to the tape drive cam 25 for rotation therewith. The timing disc, in one embodiment, has a fixed interior light source (not shown) and a multiplicity of minute peripheral orifices which permit light beams from the light source to be emitted from the disc in the form of high speed light pulses. These light pulses are picked up by a photocell 32 and each pulse causes the cell to send a signal or timing pulse to the control logic of the data recording machine, said signals being referred to hereinafter as disc sprockets (DSPR).

Figure 4:
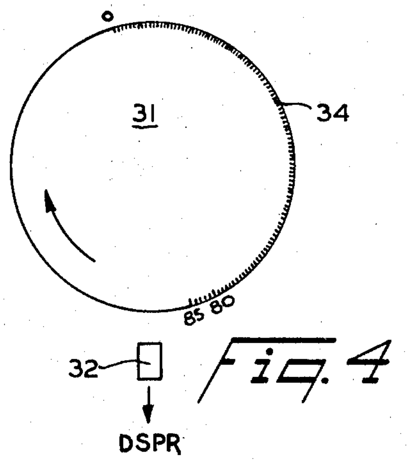
FIG. 4 is a front elevation of the timing disc.

FIG. 4 illustrates a timing disc 31 such as would be used when the recording is done with fixed length data records of 80 data characters plus a longitudinal parity character. In this figure, the uniformly spaced graduation marks 34 shown on a portion of the circumference of the disc represent the minute light emitting orifices (not shown) in the edge of the disc, the orifices being located in the portion of the disc that corresponds to the tape engaging (non-relieved) portion of cam 25. The timing disc of FIG. 4 has a light pulse orifice at the 85th graduation mark, and this is to produce a disc sprocket that will cause the longitudinal parity character to be written in the 85th position or frame on the tape. There are no light pulse orifices at the 81th to 84th graduation marks on the disc which will result in four unused frames on the tape between the 80th and 85th positions thereof. There is an orifice for each graduation mark from 01 to 80 and these will produce disc sprockets that will cause the 80 data characters to be written on tape as will be more fully described hereinafter.

With the tape drive cam 25 and timing disc 31 fixed together, the tape velocity and the disc sprockets will always be in synchronism thereby ensuring uniform density recording without the need for a synchronous motor and precision crystal oscillator as disclosed in said co-pending application Ser. No. 541,450. The spacing between the orifices in the edge of the timing disc governs the spacing between the tape frames, and recording is at a density of 200 bits per inch in the embodiment of the invention disclosed herein where the diameter of the timing disc 31 is approximately three times the diameter of the drive cam 25. In this connection, it will be apparent to those familiar with the art that a timing disc having optical or photographic timing means could be substituted for the timing disc 31, and that the disc employed can be provided with adjustment means for varying the recording density within a given range.

Reference is now made to FIGS. 5 and 6 which diagrammatically illustrate the tape write portion of the tape cycle, FIG. 5 being a flow chart and FIG. 6 being in the nature of a timing chart. As in the data recording machine disclosed in said co-pending application, the tape cycle follows the keyboard to memory portion of the entry mode during which a data record is keyed into the machine and stored in its core memory. When a complete record has been entered, a release operation is signaled which initiates the tape cycle.

The signal for the release operation is indicated by the pulse 35 in FIG. 6 and by the block 36 in FIG. 5. This signal energizes the solenoid actuator referred to above which permits cam 27 to rotate. The rotation of cam 27 allows the tape drive cam 25 to rotate whereby tape movement is initiated. The actuation of cam 25 (ACT. CAM), indicated in block 37, simultaneously actuates the timing disc 31 as shown by block 38 of FIG. 5 and at 39 and 40 in FIG. 6 where the fixed connection between the cam and timing disc is indicated at 41. With reference to the flow chart of FIG. 5 and the convention employed therein, it may be considered that the steps or occurrences listed together in a particular block, or listed in vertically aligned blocks, happen at substantially the same time.

Simultaneously with the actuation of cams 27 and 25, the memory is sequentially accessed in ascending order for the sole purpose of determining longitudinal parity (CK. PAR) and storing it in memory (PAR→M), as indicated in blocks 37 and 42. The parity is stored in the highest order data position of memory plus one, which for 80 character data records would be the 81st memory position. The determination and storage of the longitudinal parity character occurs in the time it takes the solenoid actuator to be energized and the tape to be accelerated (indicated at 39, FIG. 6) to a constant velocity and moved to a predetermined position for the commencement of the writing of data, the time interval involved being measured in terms of microseconds.

With the tape now moving at a constant velocity in the left to right or reverse direction (FIG. 2, line 1) and properly positioned to start recording, the first signal or disc sprocket (DSPR) is generated by the timing disc, as indicated by block 43 of FIG. 5 and at 44 in FIG. 6. This is the disc sprocket which corresponds to the 85th graduation mark on the disc, FIG. 4, and at this time the memory address counters are set at the 81st memory position, as indicated below block 42, which is storing the longitudinal parity character. The disc sprocket causes the contents of the addressed memory position, the 81st, to be transferred to the A register (M→A) and then transferred from the A to the B to the write register (A→B→WR), all as shown in block 45. In this manner, the longitudinal parity character is written on the tape. The registers referred to (not shown herein) are the same as those of the data recording machine disclosed in said copending application.

Simultaneously with the writing of the character on tape the memory address counters are decremented one position (DECR. MEM), also shown in block 45. The address counters are then set at the 80th memory position as indicated below the block.

Following the first disc sprocket and the writing of the longitudinal parity character on tape, the timing disc continues to rotate and the tape continues to move, the two being in synchronism with one another as previously described. As best shown by the directional arrow in FIG. 4, the disc rotation is such that its graduation marks are presented to the photocell 32 in descending order, this being the clockwise direction in the illustrated embodiment. Accordingly, the 84th to 81st graduation marks pass the photocell without any disk sprockets being produced (because there are no light pulse orifices for these graduation marks), and during this disc rotation the tape is moved a distance of approximately four frame intervals as shown by block 46, FIG. 5, and at 47 in FIG. 6.

When the 80th disc graduation mark passes the photocell, a disc sprocket is generated as indicated by block 48 of FIG. 5 and at 49 in FIG. 6, and, like the first disc sprocket, it causes the contents of the addressed memory position to be transferred to the A register and from there to the B and then to the write register. See block 50, FIG. 5. Since the memory address counters were set at the 80th memory position due to the decrement indicated in block 45, this means that the contents of this highest order data position are written on the tape. Simultaneously with the writing of the 80th data character on tape, the memory counters are decremented one position (DECR. MEM), block 50, which means that the counters are then set at the 79th memory position.

Following the blocks 48 and 50 is a diamond 51 and in the convention employed in the flow chart drawing, a diamond represents a conditional situation, or a question which the machine must ask itself before proceeding. In diamond 51, the machine is asking—substantially simultaneously with the decrementing of the memory counters in block 50—whether the new memory position that is addressed is position 01 or not. If the answer is NO, tape movement and rotation of the timing disc continue and the operations of blocks 48 and 50 are repeated. Thus, the disc sprocket at the 79th graduation mark on the timing disc causes the contents of the 79th memory position to be written on tape, the memory address counters are decremented, the 78th disc sprocket causes the 78th data character to be written on tape and so on, see FIG. 6. The writing of the data characters continues in the manner in descending order until the decrementing of the memory counters result in their addressing memory position 01.

When the position address is 01, the answer to the question of diamond 51 is YES and the sequence of events continues as indicated in Part 2 of FIGS. 5 and 6. Thus, the disc sprocket at the 01 graduation mark of the timing disc, indicated by block 52 of FIG. 5 and at 53 in FIG. 6, causes the contents of the 01 memory position to be written on tape (M→A, A→B→WR) as shown by block 54, this being the first character of the data record.

Shortly after the 01 disc sprocket, the last in the tape write portion of the cycle, the non-relieved portion of cam 25 terminates and, with the start of the relieved portion, tape movement stops, see FIG. 3. However, cam 25, timing disc 31 and cam 27 all continue to rotate until the latter has completed one revolution and further rotation is prevented by the rocker arm 28 as previously described. When cam 27 stops rotating, cam 25 and the timing disc also cease to rotate as shown by block 55, FIG. 5, and at 56, 57 in FIG. 6, and the tape write terminates, block 58.

When the tape write portion of the tape cycle terminates, a complete data record 21 has been written on it as shown in the top line of FIG. 2. The rest of the tape cycle is as previously described in connection with the figure, i.e., the pinch roll is engaged to effect forward tape movement and the read after write check (second line, FIG. 2) and, assuming that there are no errors, the erase head currents are turned on and tape movement continues in the forward direction for a distance equal to one complete data record plus the reverse start distance (third line, FIG. 2).

FIG. 7 illustrates the manner in which the tape feed of the invention enables the same skew delays to be used for both the write and the read after write portions of the tape cycle, assuming that recording is at a high enough density to require a skew delay. Thus, when the recording is at the higher densities, there must be compensations in the head for the skew that is encountered.

In FIG. 7, the portions of the read-record head for the individual tape channels are indicated symbolically at 60, portions being shown for but three of the channels in this diagrammatic illustration. Rather than being in vertical alignment, the head portions 60 are shown as being laterally displaced from one another (to a grossly exaggerated degree for illustrative purposes), the lateral displacement indicating the minute electronic and mechanical discrepancies that prevent the asbolute simultaneous action of all the head portions.

A fragment of tape is shown at 61, and this tape is moving beneath the head at a constant velocity from left to right as indicated by the arrow 62. The dotted line rectangles 53 are hypothetical bit positions of, for example, the 80th frame position (F.P. 80) on the tape, and when these positions reach a point relative to the head that is arbitrarily indicated by the dot-dash line 64 it is the beginning of the 80th frame segment on the tape. At this instant, the contents of the 80th memory position are transferred to the B register which initiates the skew compensation delays, there being an adjustable skew delay circuit (not shown) for each channel.

Continued movement of the tape brings the bit position 63 for the second tape channel (CH. 2) to the point at which the write gap for channel 2 appears. This is when the bit position has moved into registry with the channel 2 head portion 60 in the diagrammatic illustration. With the appearance of the channel 2 write gap, the skew delay for channel 2 should expire, the delay having had a relative period as indicated by the arrow $d_1$. With the tape movement continuing, the write gap for channel 1 (CH. 1) appears so that the skew delay for channel 1 should expire, this delay having had the relative period indicated by the arrow $d_2$. On further movement of the tape, the write gap for channel 3 (CH. 3) appears whereupon the skew delay for channel 3 should expire, the delay having had the relative period indicated by the arrow $d_3$. The appearance of the channel 3 write gap completes the writing of the frame position 80 in the diagrammatic illustration, and continued tape movement causes the sequence just described to be repeated for the 79th frame position.

The right side of FIG. 7 illustrates the tape 61' moving in the reverse direction for the read after write check, cf. FIG. 2. Here the dotted line rectangles 65 indicate the hypothetical bit positions of the 1st frame position (F.P. 01) on tape, and if any bits have been written in the 1st frame they will occupy these positions. As the tape moves to the left, if there is a bit in the third tape channel it will trigger the skew delay for channel 3 as it passes beneath the channel 3 head portion 60'. This delay, which is the same as in the write portion of the tape cycle, is indicated by the arrow $d_3$.

Continued movement of the tape will bring the bit, if there is one, in channel 1 under its head portion 60' and trigger the skew delay for channel 1 as indicated by the arrow $d_2$. On further movement of the tape, the bit for channel 2 passes beneath its head portion 60' and triggers the channel 2 skew delay as indicated by the arrow $d_1$. As can be seen from the drawing, the delays, which as already noted are the same for both reading and writing in the individual channels, expire at the same time at which time the character in the frame is actually read.

When the tape is required to move into the same direction for both the write and the read after write steps as shown in FIG. 1, a system of complementary skew delays is required for high density recording. The tape feed arrangement of the invention thus results in less complex circuitry and a saving on expensive components.

From the foregoing description, it will be apparent that the invention disclosed herein provides a novel and highly efficient tape feed arrangement for use in data recording machines or the like. As will be understood by those familiar with the art, the invention may be embodied in other specific forms without departing from the spirit or essential characteristics thereof. The embodiment is, therefore, to be considered in all respects as illustrative, rather than restrictive, the scope of the invention being indicated by the appended claims.

What is claimed is:

1. In a data recording machine having a read-record head, an erase head and means for moving a magnetic tape relative to the heads, the method of feeding tape during the tape cycle of the machine comprising the steps of: moving the tape in one direction beneath the read-record head while writing a data record thereon in descending order from the highest to the lowest order position, moving the tape in the opposite direction while reading the data record that has been written on it in ascending order from the lowest to the highest order position, and thereafter continuing the movement of the tape in said opposite direction for a distance equal to at least the length of a record.

2. The method as defined in claim 1 wherein the erase head is inactive during the writing and the read after writing steps, and is rendered active during the continuing movement of the tape in said opposite direction.

3. The method as defined in claim 1 wherein the continuing movement of the tape in said opposite direction is for a distance equal to one complete data record plus an amount equal to the required reverse start distance.

4. In a data recording machine having a read-record head, an erase head and means for moving magnetic tape relative to the heads, the method of carrying out the tape cycle of the machine comprising the steps of: initiating movement of the tape in one direction beneath the read-record head, writing a data record on the moving tape in descending order from the highest to the lowest order position, stopping the tape movement after a complete data record has been written thereon, initiating movement of the tape in the opposite direction beneath the read-record head, reading the data record that has been written on the tape in ascending order from the lowest to the highest order position, continuing the movement of the tape in said opposite direction for a distance equal to one complete data record plus an amount equal to the required reverse start distance, and then stopping the tape movement.

5. The method as defined in claim 4 together with the step of determining longitudinal parity before writing a data record on the tape.

6. A data recording machine for recording a series of data records on magnetic tape at a read-record station, the machine comprising:

(a) first means for moving the tape in a first direction past the read-record station a distance equal to at least the length of a data record;

(b) means for writing a data record in descending order from the highest to the lowest order position on the tape at the read-record station as the tape moves in said first direction;

(c) second means for moving the tape past the read-record station in a direction opposite to said first direction a distance equal the length of said written data record and at least the length of a second data record; and (d) means for reading said written data record in ascending order from the lowest to the highest order position as the tape moves past the read-record station in said opposite direction.

7. The data recording machine as recited in claim 6 and further including means for erasing data in said second data record when the tape moves in said opposite direction.

8. The data recording machine as recited in claim 6 including a storage memory, and wherein said first moving means comprises a rotatable cam operable in response to a signal to engage and move the tape, and said writing means comprises:

(a) a magnetic head; and (b) a timing disk fixed to said cam for rotation therewith, said timing disk having means for initiating signals at uniformly spaced intervals while the disk is rotating, each of said signals being operable to cause the contents of a memory position in said storage memory to be written on the tape by said magnetic head.

References Cited

UNITED STATES PATENTS

| | | | |
|---|---|---|---|
| 3,070,800 | 12/1962 | Brown, Jr., et al. | 340—174.1 |
| 3,328,788 | 6/1967 | Taris | 340—174.1 |
| 3,332,084 | 7/1967 | Wahrer et al. | 340—174.1 |

BERNARD KONICK, Primary Examiner

W. F. WHITE, Assistant Examiner

U.S. Cl. X.R.

179—100.2

PO-1050
(5/69)

UNITED STATES PATENT OFFICE
CERTIFICATE OF CORRECTION

Patent No. 3,550,103 Dated December 22, 1970

Inventor(s) George R. Cogar

It is certified that error appears in the above-identified patent and that said Letters Patent are hereby corrected as shown below:

At column 1, line 29:

The filing date of U. S. Patent No. 3,483,523 originally given as "March 30, 1966" should read "March 3, 1966"

Signed and sealed this 1st day of May 1973.

(SEAL)
Attest:

EDWARD M. FLETCHER, JR.
Attesting Officer

ROBERT GOTTSCHALK
Commissioner of Patents